United States Patent [19]
Soper

[11] Patent Number: 5,980,228
[45] Date of Patent: Nov. 9, 1999

[54] FOOD PATTY MOLDING MACHINE

[75] Inventor: James L. Soper, Manitowoc, Wis.

[73] Assignee: Progressive Technology of Wisconsin, Inc., Manitowoc, Wis.

[*] Notice: This patent is subject to a terminal disclaimer.

[21] Appl. No.: 09/047,070

[22] Filed: Mar. 24, 1998

Related U.S. Application Data

[63] Continuation of application No. 08/799,116, Feb. 11, 1997, Pat. No. 5,730,650, which is a continuation-in-part of application No. 08/706,405, Aug. 29, 1996, Pat. No. 5,655,436.

[51] Int. Cl.⁶ .................................................. B29C 45/80
[52] U.S. Cl. ........................... 425/145; 425/150; 425/261; 425/444; 425/449; 426/512
[58] Field of Search .................................... 425/145, 150, 425/239, 240, 544, 546, 556, 557, 562, 588, 256, 261, 444, 436 R, 449, 453; 426/512

[56] References Cited

U.S. PATENT DOCUMENTS

| | | | |
|---|---|---|---|
| 3,887,964 | 6/1975 | Richards | 425/556 |
| 4,043,768 | 8/1977 | Holly | 425/256 |
| 4,054,967 | 10/1977 | Sandberg et al. | 426/512 |
| 4,091,504 | 5/1978 | Wong | 425/377 |
| 4,118,169 | 10/1978 | Haluska | 425/256 |
| 4,153,974 | 5/1979 | Holly et al. | 425/556 |
| 4,182,003 | 1/1980 | Lamartino et al. | |
| 4,233,710 | 11/1980 | Wagner | 425/256 |
| 4,302,868 | 12/1981 | Wagner | 425/556 |
| 4,303,008 | 12/1981 | Hice et al. | 99/353 |
| 4,313,964 | 2/1982 | Dembecki | 99/353 X |
| 4,446,775 | 5/1984 | Reed | 99/353 |
| 4,539,900 | 9/1985 | Reed | 99/353 |
| 4,996,743 | 3/1991 | Janssen . | |
| 5,000,084 | 3/1991 | Walliker | 99/353 X |
| 5,309,824 | 5/1994 | Dromgoole et al. | 99/450.1 |
| 5,655,436 | 8/1997 | Soper | 425/556 |
| 5,730,650 | 3/1998 | Soper | 425/556 |

*Primary Examiner*—Tim Heitbrink
*Attorney, Agent, or Firm*—Andrus, Sceales, Starke & Sawall

[57] ABSTRACT

A food patty molding machine of the type utilizing a linearly reciprocable mold plate utilizes a direct rotary actuator drive which provides virtually direct linear transfer of the drive force to the ends of the linear drive shafts which support the mold plate. This results in the virtual elimination of high wear lateral loads. An encoder is directly linked to the rotary actuator drive shaft to provide accurate mold plate position signals which are utilized to control the operation of completely independently driven knock-out devices and to control operation of the feed ram during the feed stroke. Servo valve control of the hydraulic power unit which drives the rotary actuator and the feed ram cylinders also responds to suitably processed encoder signals to provide a wide range of speed and position control.

6 Claims, 5 Drawing Sheets

FOOD PATTY MOLDING MACHINE

CROSS REFERENCE TO RELATED APPLICATION

This is a continuation of application Ser. No. 08/799,116, filed Feb. 11, 1997, now U.S. Pat. No. 5,730,650, which is a continuation-in-part of application Ser. No. 08/706,405, filed Aug. 9, 1996, now U.S. Pat. No. 5,655,436.

BACKGROUND OF THE INVENTION

The present invention pertains to a food patty molding machine and, more particularly, to an improved drive assembly and control system for such a machine.

Machines for the high volume production of molded food patties are well known in the art. Such machines are used typically to form hamburger patties from a supply of ground beef by forcing the ground beef under pressure into a multi-cavity mold plate which is rapidly shuttled on a linear slide between a fill position and a discharge position in which vertically reciprocable knock-outs push the patties from the mold cavities. U.S. Pat. No. 3,887,964 discloses the basic construction of a food patty molding machine which is basically unchanged and remains in current use. The machine disclosed in that patent utilizes a variable speed motor-driven reducer which operates a rotary crank mechanism and cooperating mechanical linkage which converts the rotary motion to. reciprocable motion to drive the mold plate between its fill and discharge positions. The mechanical linkage includes a hydraulically buffered lost motion mechanism which is utilized to provide a short dwell in each of the mold plate fill and discharge positions. The variable speed drive is also mechanically linked to the knock-outs for discharging the patties from the mold plate in a manner which times operation of the knock-outs directly and mechanically to the reciprocable operation of the mold plate.

A number of disadvantages have been found to be attendant to the construction and operation of the above described food patty molding machine. The mechanical drive linkage includes a significant number of individual components resulting in a rather complex mechanism. An offset connection of the lost motion drive mechanism to the ends of the mold plate carriage results inherently in the imposition of significant laterally directed loads on the carriage slide mechanism. These lateral loads, in turn, have been found to cause substantial rapid wear to the linear drive shafts and supporting linear bearings which comprise the reciprocating carriage. Excessive wear can eventually lead to misalignment beyond the range of attainable adjustment, fracture of mold plates, and other potential damage if not closely monitored. At best, rapid wear of the mold plate carriage linear drives and bearings creates a chronic maintenance and replacement part problem. Also, the lost motion drive which is utilized to provide short dwell periods at the ends of the fill and discharge positions, is not easily adjustable to compensate, for example, for changes in temperature of the supply of ground meat or ground food product. Furthermore, because operation of the mold plate and the knock-outs is linked mechanically, there is no possibility of halting operation of one or the other of the subsystems in the event of a problem, such as misalignment of the mold plate with the knock-out cups in the discharge position. In addition, because of the. strict requirements imposed on machinery used in the processing of food for human consumption, the applicable regulations require rigorous cleaning procedures, in particular high pressure washing with water. Prior art machines have not been very tolerant to high pressure washing and, as a result, periodic washing often results in shorted electric motors and other electric components, rust and corrosion, loss of lubricant from grease fittings, all adding considerably to the time and cost of maintenance and repair.

BRIEF SUMMARY OF THE INVENTION

In accordance with one aspect of the present invention, a patty molding machine of the type utilizing a linearly reciprocable mold plate is provided with a direct rotary actuator drive which provides virtually direct linear transfer of the drive force to the ends of the linear drive shafts supporting the mold plate and the virtual elimination of high wear lateral loads. The rotary actuator is operable to provide variable speed operation and closely controllable positioning in a manner obviating the need for complex lost motion linkages. An encoder directly linked to the output of the rotary actuator is used to control the operation of a completely independently driven knock-out mechanism, obviating the need for a timed mechanical link between the mold plate and the knock-outs.

The improved drive apparatus, according to one aspect of the present invention, includes a main drive arm having a drive end fixed for reciprocable rotational movement on an axis which is parallel to and spaced from the plane of the mold plate linear drive shafts and a driven end which is positioned to move in a shallow arc substantially in that same plane. A rigid linear drive link has a first link end rotatably connected to the end of one of the linear drive shafts for movement therewith in said plane, and a second link end rotatably connected to the driven end of the drive arm for movement therewith in the shallow arc. A direct drive provides reciprocable rotation to the drive arm.

Preferably, a main drive arm is provided for each linear drive shaft. A main driving shaft provides a fixed connection for the drive end of each of the main drive arms and defines the axis of rotation for said drive arms. A driving connection is provided between said direct drive and the main driving shaft. The direct drive preferably comprises a rotary actuator and the main driving shaft comprises the output shaft of said rotary actuator. In the preferred embodiment, the rotary actuator is hydraulically driven.

The drive apparatus of the present invention provides positions between a top dead center position of the drive arms and each of the fill position and the discharge position of the mold plate in which each of the linear drive links is positioned colinearly with its respective linear drive shaft. In both of the fill and discharge positions and in the top dead center position, the linear drive links are positioned substantially equiangularly with respect to their respective linear drive shafts. To minimize undesirable lateral loading, the extreme equiangular positions of the drive links with respect to the drive shafts are preferably no greater than about 7.5°, and the total arc of rotation between each drive link and its respective drive arm is preferably no greater than about 15°.

In an alternate embodiment, the direct drive may comprise a linear hydraulic cylinder. The main shaft is preferably provided with a crank arm to which the hydraulic cylinder is attached to provide the direct driving connection Other drive means, such as an electric servomotor could also be utilized to provide a direct driving connection to the main driveshaft. Although the use of a rotary hydraulic actuator and a pair of drive arms provides a compact drive arrangement, alternate driving arrangements which completely eliminate the drive arms could also be utilized. For example, linear racks disposed parallel to and connected to the ends of the reciprocating linear driveshafts could be directly driven by servomotor operated pinions in direct engagement with the racks. It is believed, however, that such an alternate arrangement would not as efficiently utilize the available space below the plane of the mold plate, as does the presently preferred embodiment.

In accordance with another aspect of the invention, a meat product molding machine of the type described includes a horizontally operable feed ram which is disposed to move reciprocally in a meat feed chamber receiving ground meat from an upper supply hopper, the ram being movable through a forward stroke to transfer meat from the feed chamber through a distribution manifold and into the mold cavity of a mold plate positioned in a fill position, which mold plate is movable in a linear reciprocable path between the fill position and a discharge position, the machine further including a vertically reciprocable knock-out device operable to pass through the mold plate in the discharge position to push the product from the mold cavity, and a pair of parallel laterally spaced linear drive shafts supporting the mold plate for movement therewith along the linear mold plate path, the improvement which comprises a pair of drive arms, each having a drive end attached to a main driving shaft for reciprocable rotational movement therewith about a driving shaft axis disposed parallel to and spaced from the plane of the linear drive shafts, each drive arm having a driven end connected to the end of a linear drive shaft to deliver a direct substantially linear driving force along the drive shaft axis; an encoder responsive to the reciprocable rotational movement of the main driving shaft to provide control signals which are representative of mold plate position at and between the fill and discharge positions; and, means responsive to the encoder control signals to independently drive the ram and the knock-out device.

In accordance with yet another aspect of the invention, controlled operation of the food product molding machine of the present invention is provided by a method including the steps of driving the linear driveshafts to continuously cycle the mold plate in its reciprocal path, monitoring the mold plate position over the full cycle of mold plate movement, generating control signals which are representative of mold plate position, commencing forward movement of the feed ram to feed a multiple food product into the mold plate cavity in response to a fill-on control signal generated during the return stroke, terminating forward movement of the ram and the feeding of food product to the mold cavity in response to a fill-off control signal which is generated during the discharge stroke, holding the mold plate for a discharge dwell time in the discharge position in response to a discharge position signal, and selectively adjusting the discharge dwell time to vary the mold plate cycle time.

The method may also include the step of holding the mold plate for a dwell time in the fill position in response to a fill position signal. In the preferred embodiment of the machine, a pair of alternately operable feed rams are utilized. Each ram is adapted to move through one forward stroke during multiple mold plate cycles and to return in a reverse stroke in response to an end of stroke signal. The end of stroke signal operates to cause initial movement of the other ram through its forward stroke, and the method may also include the step of utilizing the fill-on and fill-off control signals to provide a mold fill period of delay of the response to the end of stroke signal.

In a variant method for operating a food patty molding machine of the type having a mold plate with the mold cavity, which plate is cycled in a linear reciprocable path that is defined by a return stroke to a fill position, an opposite discharge stroke to a discharge position, and a discharge dwell time in the discharge position, the method comprising the steps of: providing a drive for continuously cycling the mold plate in its reciprocal path, monitoring the mold plate position over the full cycle of mold plate movement, generating control signals which are representative to mold plate position, feeding a moldable food product to the mold plate cavity in response to a fill-on control signal which is generated during the return stroke, terminating the feed step in response to a fill-off control signal which is generated during the discharge stroke, and varying the time of the complete mold plate cycle by adjusting the discharge dwell time.

A related drive system for operating the food product molding machine includes means for driving the linear drive shafts to continuously cycle the mold plate, means for monitoring the mold plate position over the full cycle of movement and for generating control signals representative of mold plate position, means for commencing forward movement of one of two feed rams to feed multiple food product to the mold plate cavity, means for terminating forward movement of said one ram and the feed of food product to the mold cavity, and means for holding the mold plate in the discharge position for a selectively variable discharge dwell time. The means for commencing forward movement of the ram is preferably responsive to a fill-on control signal generated during the return stroke. The means for terminating forward movement of the ram is preferably responsive to a fill-off control signal generating during the discharge stroke. The means for holding the mold plate for a dwell time is preferably responsive to a discharge position signal.

The system preferably includes means for holding the mold plate in the fill position for a selectively variable fill dwell time. The fill position holding means is preferably responsive to a fill position signal. The system preferably also includes means responsive to an end of ram feed stroke signal for reversing the operative ram and for commencing the feed stroke of the other ram, and delay means for holding the response to the end of feed stroke signal until generation of the next fill-off signal. The means for adjusting the discharge dwell time is also preferably responsive to a change in fill dwell time to maintain a constant mold plate cycle time.

BRIEF DESCRIPTION OF THE DRAWINGS

FIG. 10 is a sectional detail of the rotary actuator shown in FIGS. 1 and 4 showing the stroke adjustment feature.

FIG. 11 is a sectional detail taken on line 11—11 of FIG. 2.

DETAILED DESCRIPTION

Figure 1:
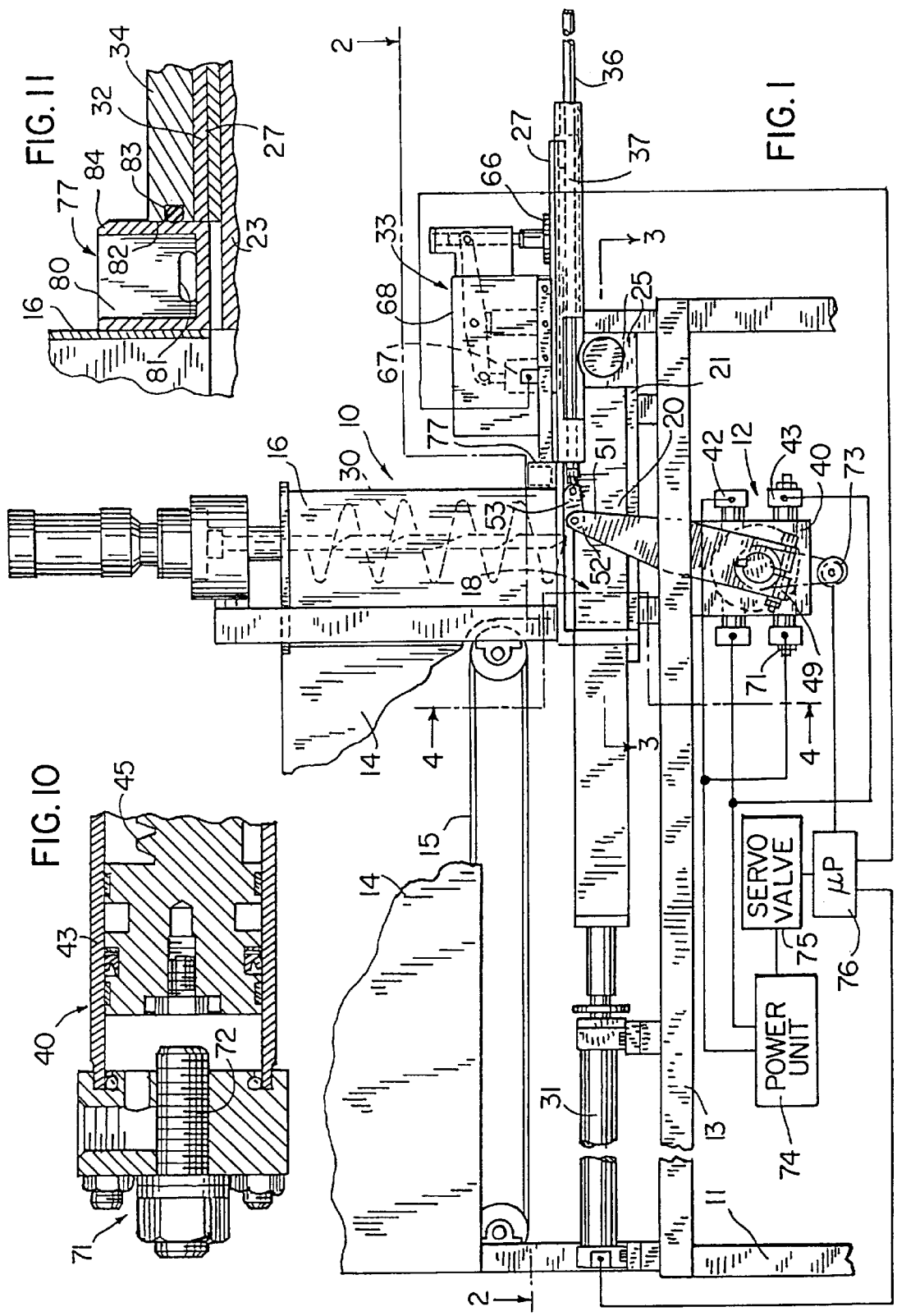
FIG. 1 is a side elevation of the food patty molding machine of the present invention.
Figure 2:
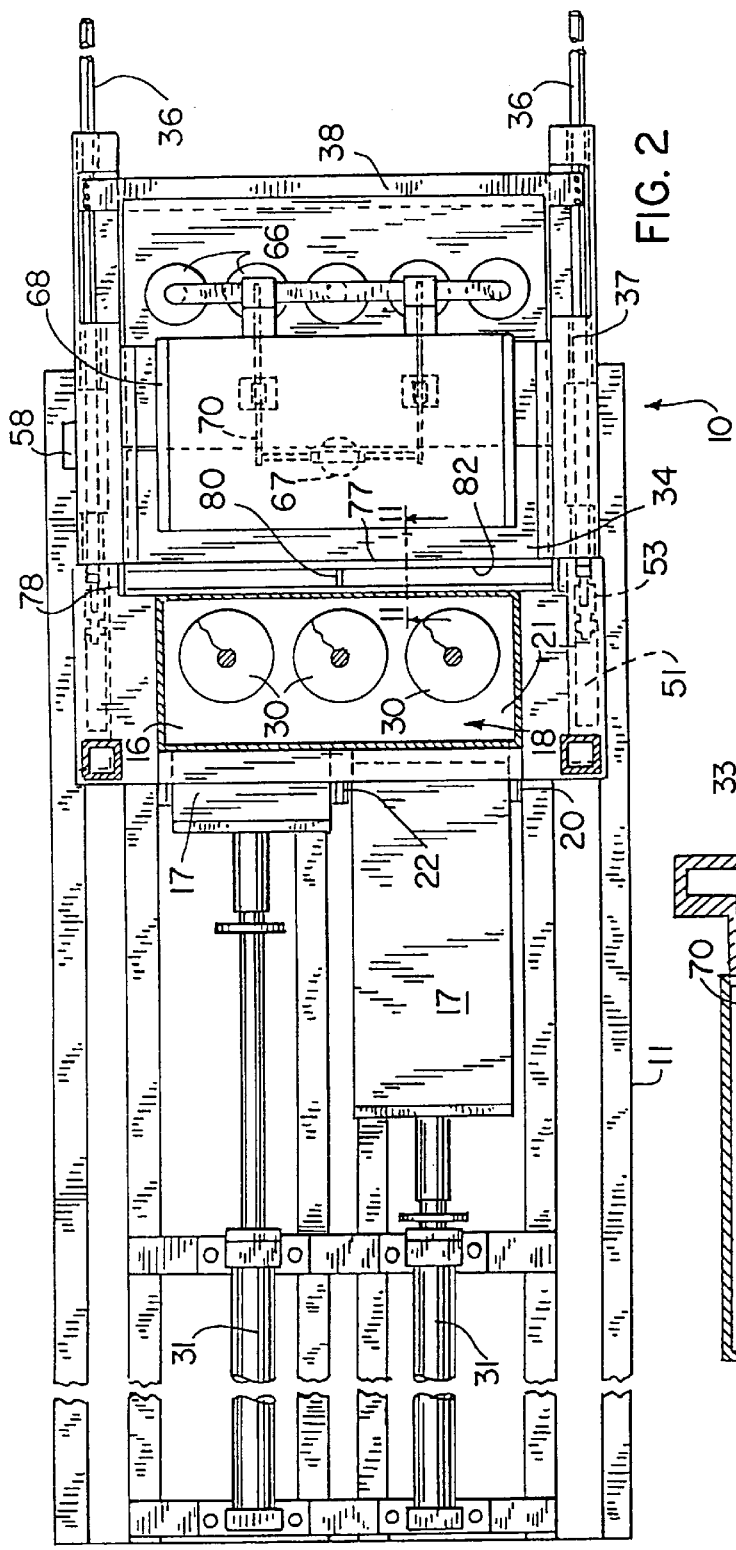
FIG. 2 is a plan view, partly in section, of the apparatus shown in FIG. 1 and taken on line 2—2 thereof.

Referring initially to FIGS. 1–4, a patty molding machine 10 of the present invention is mounted substantially atop a generally rectangular frame 11, except for the main drive 12 for the patty mold plate, which main drive is mounted to depend downwardly from the upper main frame members 13. The remainder of the interior of the frame provides a housing for the hydraulic power unit, controls and circuitry therefor, and the electrical and microprocessor controls (none of which are shown).

Ground beef or other ground food product is loaded into a supply hopper 14 where it is moved forwardly by an underlying supply conveyor 15 into a vertically disposed feed hopper 16 at the downstream end of the supply conveyor. Beneath the supply conveyor and extending directly below the bottom of the feed hopper 16 are a pair of laterally disposed horizontally reciprocable feed rams 17. The rams are rectangular in cross section and operate side-by-side in a pair of rectangular shaped feed chambers 18 which lie substantially below the feed hopper 16. The feed chambers are defined by laterally opposite side walls 20, a common bottom plate 21, a common center wall 22, and a common top plate 23 which extends forwardly from a rear edge 24 adjacent the forward edge of the feed hopper 16. Thus, the feed hopper has an open bottom allowing the food product to be fed vertically downwardly into a feed chamber 18 when the ram 17 is withdrawn from the chamber, but which opening is closed as the ram is stroked forwardly through the chamber beneath the feed hopper 16 and then beneath the top plate.

A product distribution manifold 25 is mounted to extend across the machine, beneath the top plate 23 and abutting the downstream end 26 of the bottom plate 21. Thus, the manifold defines the downstream end of the feed chambers 18 and provides an opening for the ground meat or other food product as it is transferred under pressure of one of the rams 17 from the feed chamber to the mold cavities in an upper mold plate 27. A rotary manifold valve 28 operates in the interior of the manifold 25 to direct food product delivered by the ram 17 which is operating in its feed stroke to the mold plate, and to close off the feed chamber 18 for the other ram in the retracted position to allow the feed chamber to be filled from the feed hopper 16. Thus, the feed rams 17 operate alternately, as shown in the drawings, but are fed by the common feed hopper 16. The hopper includes three vertically driven feed augers 30 which, in a manner known in the prior art, are driven by separate motors 29 and operated in pairs to deliver food product to the feed chambers. The center feed auger 30 and the adjacent auger are operated to fill the chamber from which the ram is withdrawn, while the opposite auger, above the ram moving in its feed stroke, is inoperative. Each of the rams 17 is independently driven by a hydraulically driven ram cylinder 31 mounted on the upper frame members 13 below the supply hopper 14.

Figure 9:
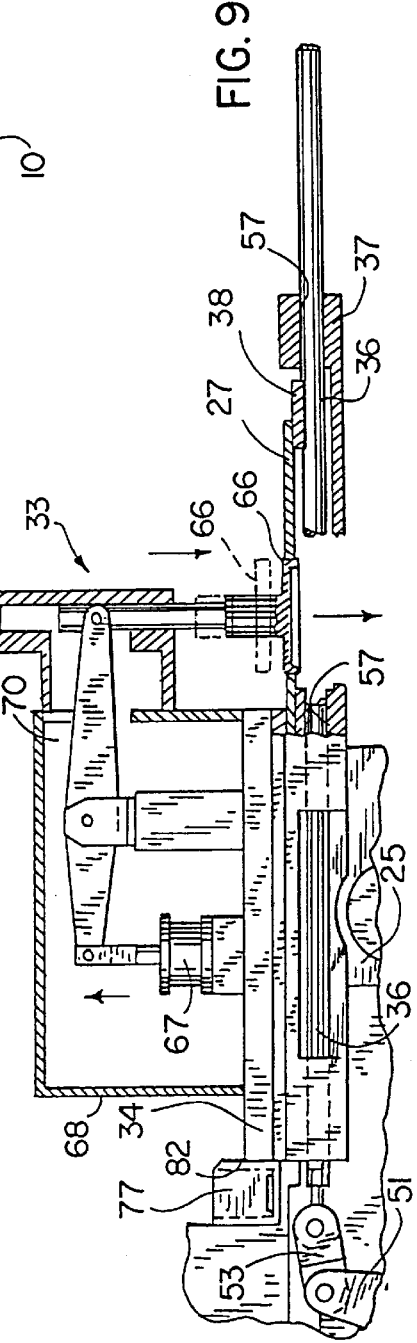
FIG. 9 is a view similar to FIG. 8 showing operation of the discharge knock-out device.
Figure 3:
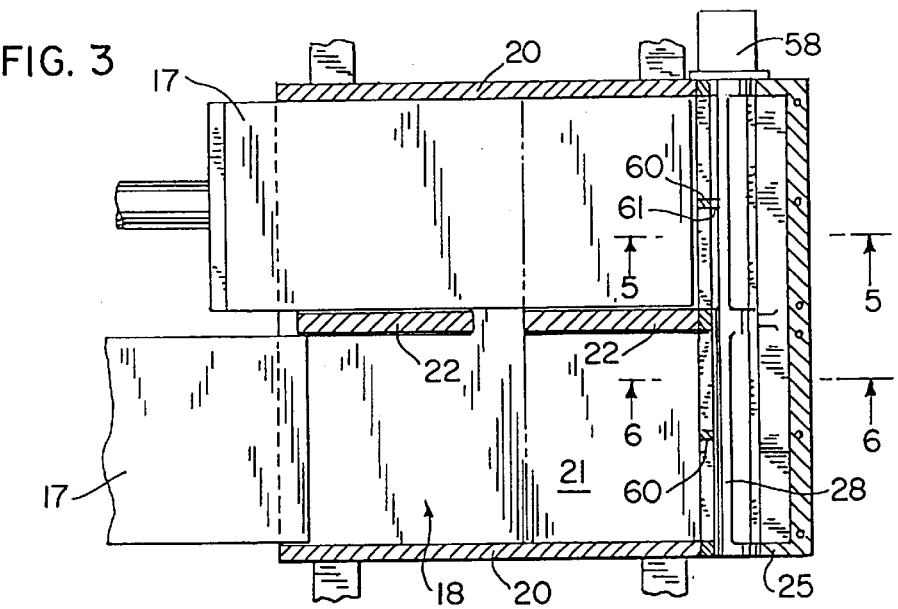
FIG. 3 is a horizontal section taken on line 3—3 of FIG. 1.
Figure 7:
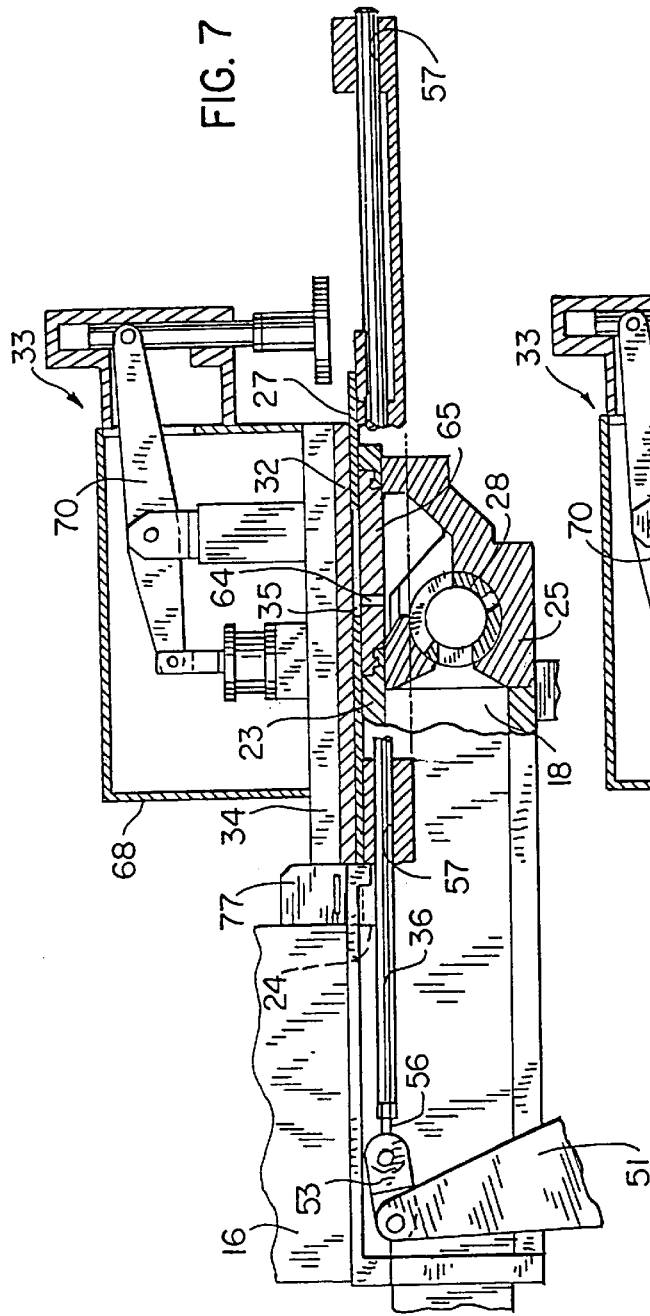
FIG. 7 is a vertical side sectional view of the mold plate and knock-out portions of the machine in the mold fill position.
Figure 8:
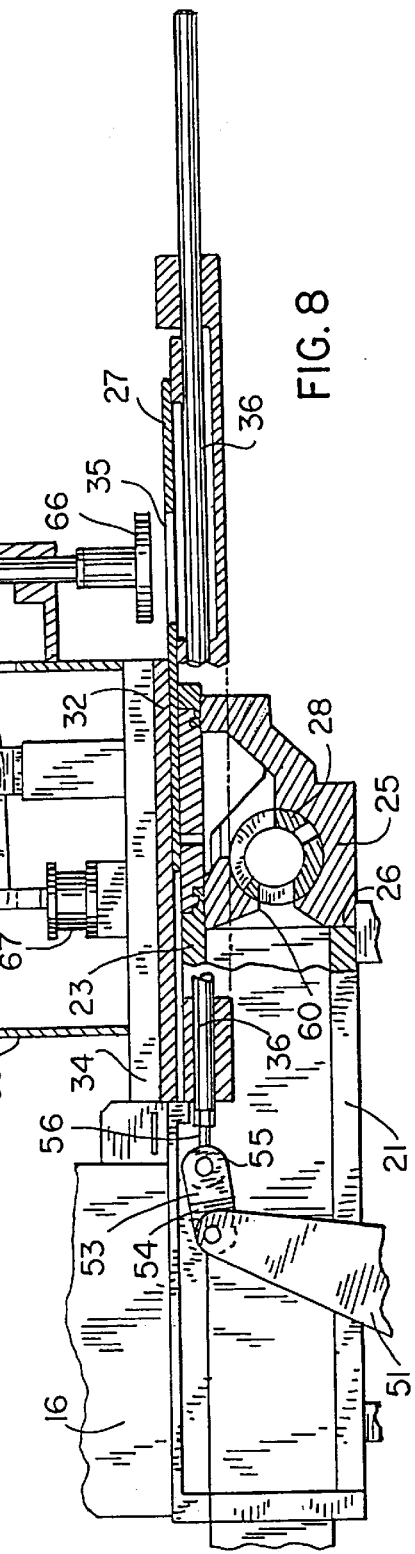
FIG. 8 is a vertical side sectional view similar to FIG. 7 showing the mold plate in the discharge position.

The top plate 23 which defines the top wall of the downstream ends of feed chambers 18, also overlies the manifold 25 and supports the mold plate 27 which slides reciprocally over the top plate between a fill position above the manifold 25 (see FIG. 7) and a discharge position in which most of the mold plate is extended substantially beyond the top plate 23 and manifold 25 (see FIGS. 8 and 9). The top of the mold plate 27 in the fill position is covered by a breather plate 32, allowing air to escape during mold plate filling, and the entire mold station is overlain by the housing for a knock-out device 30 which is supported on a cover plate 34. The cover plate and the entire knock-out device 33 supported thereon are mounted on a lift system (not shown) by which the cover plate may be raised to permit access to the molding station, as for mold plate change, maintenance and cleaning, or the like.

The mold plate 27 is of a conventional construction and comprises a thin rectangular plate with a series of laterally aligned circular openings defining mold cavities 35 in which the ground meat or other food product patties are formed. The mold plate is attached to and carried between its fill and discharge positions on a pair of laterally spaced linear drive shafts 36. The drive shafts are of circular cross section and each linear drive shaft is mounted for sliding reciprocal motion in a shuttle bar 37 mounted to the side edge of the top plate 23. The linear drive shafts 36 are connected by a laterally disposed draw bar 28. The downstream edge of the mold plate 27 is bolted or otherwise demountably attached to the draw bar 38 to support the mold plate for reciprocal motion with the drive shafts 36. An upstream portion of the mold plate is always retained between the top plate 23 and the breather plate 32 as it shuttles between the fill and discharge positions.

It should be noted that a single feed stroke of a feed ram 17 will provide enough product for many mold plate cycles. Thus, referring to FIG. 2, the upper ram 17 is shown near the end of its feed stroke, during which the mold plate cavities 35 (of which there are five in this example) will have been filled, shuttled to the downstream discharge position where the knock-out device 33 moves vertically to push the patties from the mold cavities, and recycled through the fill-discharge cycle as many as 15 to 20 times during one feed stroke of the ram.

In the presently preferred embodiment, the linear drive shafts 36 which carry the reciprocal mold plate 27 are driven by a rotary actuator 40 in a manner which provides virtually direct linear transfer of the rotary driving force from the actuator to the ends of the linear drive shafts, resulting in the virtual elimination of high wear lateral loads typical of prior art devices. The rotary actuator 40 is attached to the underside of the upper main frame members 13 with a mounting bracket 41. The rotary actuator shown is of the two cylinder type in which upper and lower actuator cylinders 42 and 43 are mounted and operated to stroke simultaneously in opposite directions to provide reciprocal rotary movement to a main driving shaft 44 mounted to extend laterally through the actuator between the cylinders 42 and 43. In a manner well known in the art, the operating pistons of the actuator cylinders are toothed racks 45 and the driving shaft 44 includes a pinion (not shown) mounted on the center of the shaft 44 and captured between the opposed toothed racks 45. The actuator may be supplied by a suitable controlled supply of hydraulic pressure to alternately stroke the actuator cylinders 42 and 43 in opposite directions to provide the desired reciprocating rotary motion to the main driving shaft 44. Each end of the driving shaft 44 is connected with a suitable coupling 46 to an axially aligned stub shaft 47 rotatably supported in a bearing 48. Each of the bearings 48 is, in turn, mounted on a bearing support plate 50 attached to the upper main frame 13.

A main mold plate drive arm 51 is clamped by a drive end 49 to the outer end of each stub shaft 47 for reciprocal rotation therewith. The drive arms 51 extend upwardly to driven ends 52, each of which is connected to the end of one of the linear drive shafts 36. The driven ends 52 of the drive arms necessarily operate in a circular arc, but the significant length of the drive arms and the relatively small rotational arc through with the arms rotate result in the driven ends 52 traveling through a short shallow arc which does not depart significantly from the horizontal plane of the linear drive shafts 36. In other words, the driven end of the drive arm, through the full range of its reciprocal rotation, remains substantially on the axis of the linear drive shaft 36 to which it is attached. However, this small amount of rotational movement requires each connection to be made with a short drive link 53. Each drive link has a flat end 54 which is pinned in a clevis formed in the driven end 52 of the drive arm and a clevis end 55 which is connected to the free end of the linear drive shaft 36, such as with a rod end bearing 56.

Full stroke of the mold plate from its fill position to its discharge position requires only 300 of rotation by the rotary actuator 40 and thus 300 rotation of the drive arms 51. In the extreme positions of fill and discharge, the drive links 53 are only angled about 7.50 downwardly from the horizontal and thus rotate with respect to their pinned connections to the driven ends 52 of the drive arms through a total arc of only about 15°. The actuator is positioned midway between the extremes of drive arm rotation and the drive arms are positioned to sweep a shallow arc which carries the upper driven ends above the horizontal plane of the axes of the linear shafts 36. Thus, at the top dead center position of the drive arms, the driven ends of the arms (and the ends 54 of the drive links connected thereto) are above the plane of the linear shafts. In this position, the drive links are angled upwardly from the horizontal by about the same 7.50. In the two mid-positions between drive arm top dead center and the fill and discharge positions, the drive links are horizontal and each driven end 52 of a drive arm lies directly on the axis of the linear shaft 36 to which it is connected. As a result, the mold plate driving force is always imposed nearly linearly on the linear drive shafts, resulting in a very minor, if any, lateral force component tending to lift up or pull down on the drive shaft ends, depending on the direction of motion and drive arm position. This arrangement causes far less wear on bearing surfaces 57 in the shuttle bars 37 through which the linear drive shafts reciprocate. Also very important is the minimization of transfer of vertical loads imposed on the ends of the linear drive shafts downstream to the points where the draw bar 38 and mold plate 27 are connected. As may be seen in the mold plate in FIG. 2, the relatively large mold cavities 35 result in fairly small web sections in the mold plate between the cavities. Vertical up and down loads imposed on the linear drive shaft ends because of the non-linear drive linkages typical of prior art machines often result in fracture of the mold plate.

Figure 4:
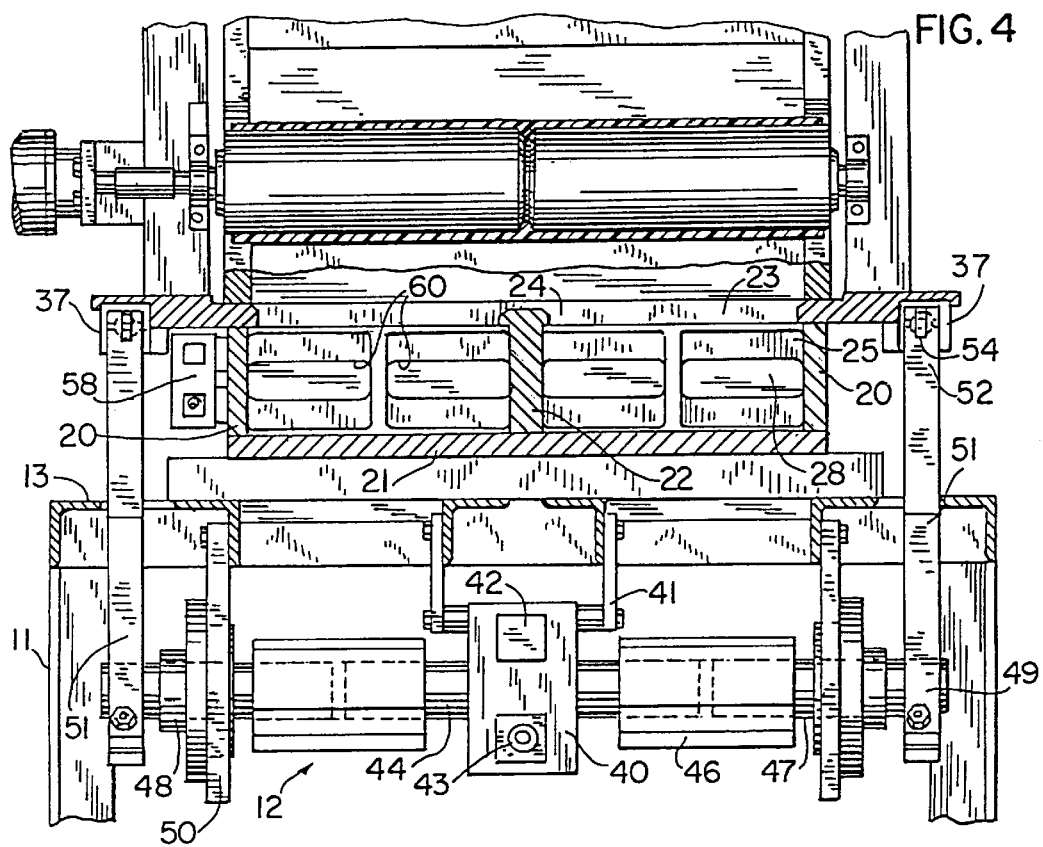
FIG. 4 is a vertical section taken on line 4—4 of FIG. 1.
Figure 5:
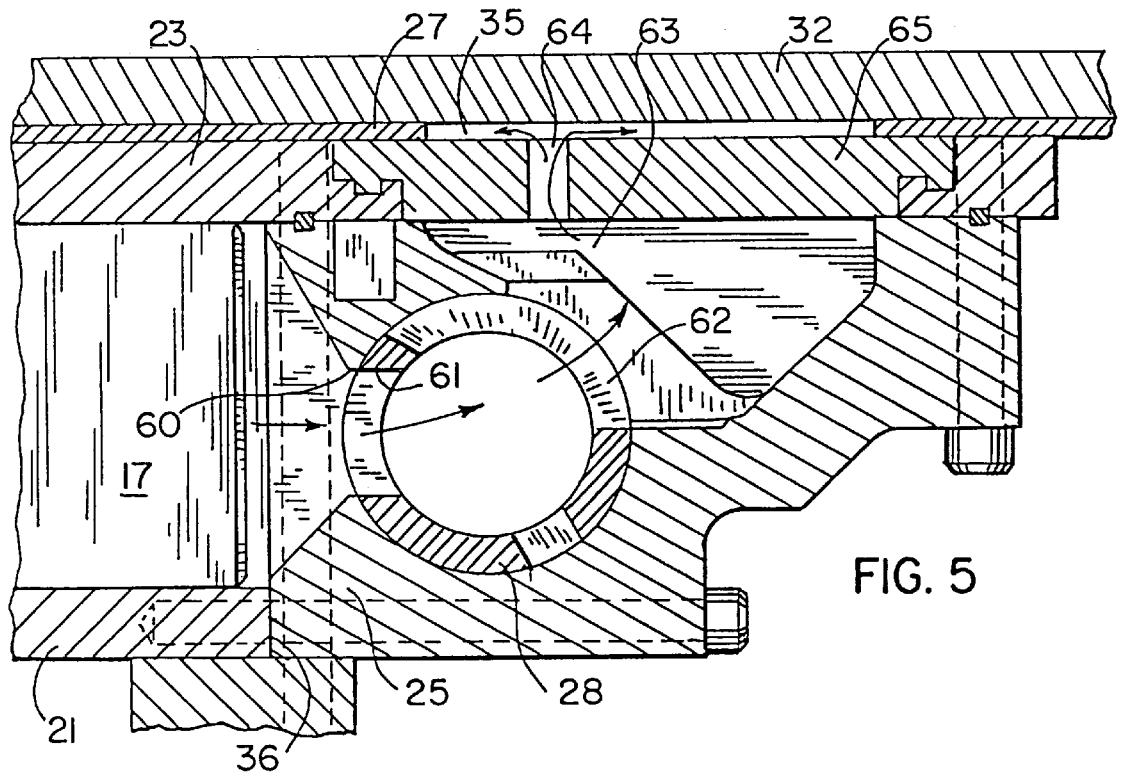
FIGS. 5 and 6 are enlarged sectional details taken on lines 5—5 and 6—6, respectively, of FIG. 3.
Figure 6:
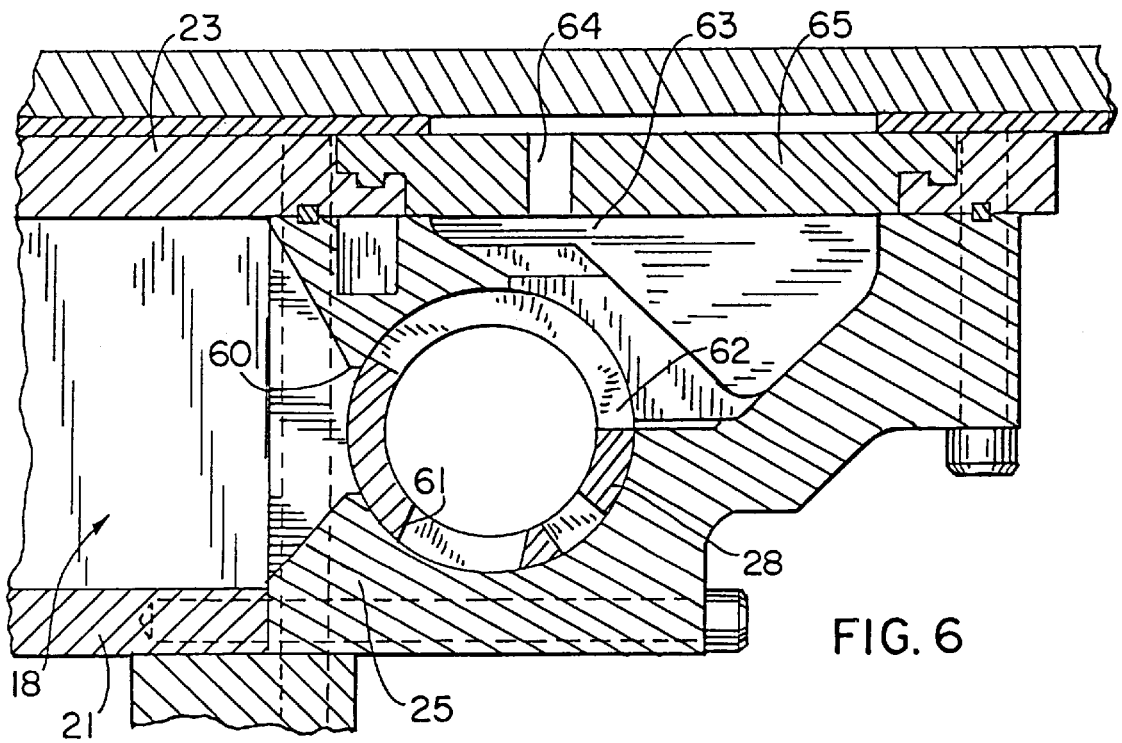

The manifold valve 28 is basically a ported cylindrical sleeve which operates with a reciprocal rotational movement inside the manifold 25. The manifold valve 28 is operated with a small rotary actuator 58 mounted on one of the upper side frame members 13 and having a direct axial driving connection to the valve 28. The actuator 58 may be identical to rotary actuator 40, except that it is of a much smaller size. Operation of the small rotary actuator 58 and thus the manifold valve 28 are driven in timed relation to the cyclic reciprocation of the feed rams 17. Referring particularly to FIGS. 4–6, the manifold valve 28 is positioned to uncover and open a pair of feed slots 60 at the end of the feed chamber 18 carrying the ram which is being stroked in the feed direction. That orientation of the manifold valve 28 automatically closes the feed slots 60 in the feed chamber for the other ram 17 which has been withdrawn or is being withdrawn to refill its feed chamber. The manifold valve 28 is provided with two pairs of feed passages 61 of a size and shape to correspond to the feed slots 60, but with the pair of feed passages for one of the feed chambers displaced circumferentially around the cylindrical manifold valve so the valve covers and closes the feed slots in the chamber from which product is not being fed. The circumferentially opposite side of the manifold valve has a full length transfer passage 62 which extends circumferentially around the valve far enough so that it remains open to permit passage of the food product upwardly and out of the manifold regardless of which feed passages 61 are being utilized. From the transfer passage 62, the product passes through an upper outlet passage 63 in the manifold 25 and vertically upward through a fill slot 64 in the top plate 23 which overlies the manifold. Actually, the fill slot is formed in an insert plate 65 placed in a suitable opening in the top plate 23. This permits exchange of fill slots to accommodate different products, different mold plates, and the like. As may be seen best in FIGS. 5 and 6, ground meat or other food product passing through the fill slot 64 moves directly into the mold cavities 35 which overlie the fill slot when the mold plate is in the retracted fill position. The filled mold plate is slid forward to the discharge position (FIGS. 8 and 9) where a ganged array of knock-out cups 66 is moved downwardly simultaneously to push the molded food patties downwardly out of the mold cavities. The knock-out device 33 includes a short stroke knock-out cylinder 67 mounted within the upper housing 68 and operable to move one end of a lever arm assembly 70, the opposite end of which carries ganged knock-out cups 66. The knock-out device is driven completely independently of the mold plate drive, with its operation timed with respect to the mold plate drive by signals generated from the drive in a manner which will be described.

With the feed ram 17 moving forwardly in its feed stroke (such as the ram 17 shown uppermost in FIGS. 2 and 3), the manifold valve 28 is positioned as shown in FIG. 6 to allow the meat product to pass through the manifold feed slots 60 in the manifold, the aligned feed passages 61 in the valve, through the interior thereof, and upwardly through the transfer passage 62, outlet passage 63 and fill slot 64, and into the mold cavities 35, all as previously described. While the mold plate is in the fill position, it may be held there for a short dwell period to accommodate filling. Utilizing a rotary actuator 40 for the main mold plate drive, the dwell may be provided by simply halting rotary motion of the actuator for the desired dwell period. This eliminates the need to utilize complex hydromechanical lost motion devices typical of the prior art. When the rotary actuator is again operated to move the mold plate to the discharge position, another short dwell period is provided while the knock-out cylinder 67 is actuated to operate the knock-outs 66 which pass vertically downwardly through the mold cavities 35 in the mold plate, as shown in FIG. 9.

There may be only 0.1 inch (2.5 mm) total clearance between the knock-out cups 66 and the side walls of the mold cavities 35. Therefore, it will be understood that extremely accurate positioning of the mold plate in the discharge position is required. Precise positioning of the mold plate in the discharge position is easily accommodated with control signals generated by an encoder 73 mounted to be driven by the rotary actuator drive, as will be described hereinafter.

In the operation of prior art devices, when the mold plate is moving to the discharge position and the fill slot 64 in the top plate is covered and closed by the solid portion of the mold plate, there will be a pressure build up in the ram cylinder 31 which continues to advance in its feed stroke. In the prior art, a pressure responsive device on the cylinder senses the increase in pressure and halts the advance of the ram until the mold plate has returned or is returning to the fill position at which time the ram may be actuated by a sensed pressure decrease to continue to advance in the feed stroke. As is also typical of prior art devices, operation of the knock-out device is timed by a direct mechanical link to the main mold plate drive. With this mechanical link, inaccurate positioning of the mold plate in the discharge position, resulting for example from wear in the drive linkage, may result in catastrophic contact between the knock-outs and the mold plate.

In accordance with the present invention, overpressure sensing control of the feed strokes of ram cylinders 31 and mechanically linked timed operation of the knock-outs are both eliminated. An encoder 73 is directly connected to the main driving shaft 44 to operate directly in response to reciprocal rotation thereof to generate control signals which are very accurately representative of the mold plate position at and between the fill and discharge positions. These signals may then be utilized to provide accurate timed operation of the feed stroke movement of the rams and the operation of the knock-out device. For example, to enhance cycle speed and efficiency, an encoder signal may be utilized on the return stroke of the mold plate from the discharge to the fill position to generate a fill-on signal as the mold cavities approach the fill slot to reactivate the ram to advance. The ram continues to advance while the mold plate returns to the fill position, is held there for a short dwell period and begins reverse movement toward the discharge position. When the mold plate reaches a selected fill-off position, an encoder signal is processed to deactivate the ram once again. Similarly, encoder signals may be utilized to activate knock-outs only when the mold plate is in the discharge position.

Position sensors on the knock-out device 33 are also utilized to prevent operation of the mold plate in the event the knock-outs are misaligned or not operating properly. The knock-out cylinder 67 is operable in response to an encoder signal to stroke the knock-outs only when the mold plate is in the discharge position. Appropriate proximity sensors detect the down position of the knock-outs, assuring they have stroked properly, and allows them to retract. The up position of the ejectors is independently detected to confirm they have been properly retracted before the mold plate can be stroked back to the fill position. This separate independent operation of the mold plate and knock-out device avoids the potential problems of prior art devices which are mechanically linked and forced to cycle together, even in situations of potentially catastrophic misalignment.

Referring again to FIG. 1, there is shown a basic schematic of use of the encoder signals to operate the system power unit to provide a controlled supply of hydraulic fluid for various operating subsystems of the machine. The power unit 74 includes the usual motor-driven hydraulic pump, associated control valves, fluid supply and return lines, and reservoir, all as is well known in the art. Direct control of the power unit is accomplished via a hydraulic servo valve 75 which receives signals from the encoder 73 with the signals suitably processed by an intermediate microprocessor 76. For example, encoder signals representative of the fill and discharge positions of the mold plate provide the basis for precisely determining the mold plate position anywhere in between and during plate movement in either direction. These encoder signals can then be processed by the microprocessor 76 to, for example, actuate the ram cylinder 31 at any selected position of the mold plate in the return stroke, set the dwell time of the mold plate in the fill position, shutoff the cylinder and associated feed ram 17 at any selected position in the mold plate discharge stroke, and provide a discharge position signal allowing the knock-out device 33 to be actuated. Cycle speed may also be changed by variable control of the servo valve 75 in either direction of mold plate movement. In this manner, total cycle time can be adjusted without changing or otherwise affecting the fill portion of the cycle. The portion of the mold plate return stroke between knock-out and the fill-on position where the ram is again activated provides one zone of speed adjustment. The other speed adjustment zone comprises the portion of the discharge stroke between the fill-off position and the end of the discharge stroke at the knock-out position.

The rotary actuator 40 is preferably operated to provide uniform acceleration and deceleration in both the return stroke and the discharge stroke, and to operate both strokes at the same speed. Cycle time may be conveniently and simply varied by adjusting the dwell time in the discharge position. In this manner, the fill portion of the cycle is totally unaffected which is extremely important in maintaining the uniformity of the molded food product. In the practical operation of a molded food processing plant, factors both upstream and downstream of the patty molding machine of the present invention may require or make it desirable to operate the machine at a slower or faster speed. For example, if the supply of meat to the hopper 14 is interrupted or slowed, the machine cycle time may need to be correspondingly slowed to avoid exhaustion of the food supply. Similarly, downstream interruptions in equipment or processes for handling the formed food patties may make it necessary or desirable to temporarily slow the cycle time of the machine. In prior art machines, slowing the cycle time caused a uniform slowing of the entire cycle, including the fill portions of the return and discharge strokes. However, corresponding adjustment of the fill-on and fill-off positions could not be effected and, as a result, the consistency and/or quality of the molded food products varied.

It may also be necessary or desirable to adjust the fill portion of the cycle and to do so without changing the cycle time. For example, a significant change in the temperature of the food product being supplied to the machine will have a significant affect on how the product molds. If the temperature of the food product supply drops significantly, it may be necessary to adjust the timing of the fill-on or fill-off signals or to increase the fill position dwell time. A change in the latter would normally cause a change in cycle time. However, with the present machine, any change in the fill position dwell time can be compensated with an identical, but opposite change in the discharge dwell time and, as a result, the cycle time remains unchanged.

With the use of a programmable controller in the microprocessor 76, it is possible to establish parameters for optimum molding of a particular food product based on its known content, supply temperature, and other factors, and to program the optimum fill-on, fill dwell, and fill-off times in the microprocessor controller. The machine may then be operated at any desired speed by appropriate adjustment of the discharge dwell time (within the range of available cycle times) without altering the critical mold fill portion of the cycle.

As indicated previously, the feed chambers 18 and length of stroke of each of the rams 17 is designed to provide multiple mold plate fill cycles per ram feed stroke. In the prior art the end of the ram feed stroke is sensed by an appropriate limit switch or proximity sensor and the signal generated is used to begin feed stroke movement of the other ram 17 and to halt and reverse the ram which has reached the end of its feed stroke. However, if the mold plate is being filled when feed is shifted from one ram to another, an intermittent halt in product flow may result in the mold cavities 35 being only partially filled and, of course, defective molded food products. However, in the present machine, the encoder keeps accurate track of the exact position of the mold plate and, if the encoder signals indicate that the mold plate is anywhere between the fill-on and fill-off positions, the manifold valve 28 will not be rotated and the other ram will not begin its feed stroke until the fill portion of the cycle has been completed, in other words, until a fill-off signal from the encoder has been processed.

Prevention of inadvertent over-travel by the rotary actuator 40 is easily and accurately accomplished by utilizing the actuator stroke adjuster 71 shown in FIG. 10. The stroke adjuster comprises a large threaded stud 72 which may be adjusted axially within one of the actuator cylinders 42 or 43 to provide a physical end stop for travel of the toothed rack 45 in that cylinder. A similar stroke adjuster 71 may be provided at the other end of the actuator cylinder to fix the extent of travel of the mold plate in the fill position. Stroke adjustment mechanisms 71 are only required on one of the actuator cylinders because they are mechanically tied together via their toothed racks and common pinion.

In prior art machines, the relatively thin sheet metal feed hopper 16 is subject to cyclical forces because of the periodic operation of the feed augers 30 which are timed generally to coincide with the intermittent operation of the feed rams 17 with each mold fill cycle. As a result, the walls of the feed hopper actually expand and contract and this cyclical flexing has resulted in formation of cracks in the bottom of the hopper in certain prior art devices. In prior art machines, as indicated above, the cover plate 34 and the entire knock-out device 33 supported on the cover plate may be raised vertically to permit access to the molding station. Attempts have been made in prior art devices to seal the joint between the front wall of the feed hopper 16 and the rear edge of the cover plate which moves vertically with respect to the hopper when raised to access the molding station. Nevertheless, this joint is the subject of substantial leakage of food product which adds considerably to the difficulty in maintaining a clean operating environment. Referring also to FIG. 11, the improved machine of the present invention provides a rigid reinforcing channel member 77 between the front wall of the feed hopper 16 and the rear edge of the cover plate 34 which serves to resolve both of the foregoing problems. The channel member 77 has a generally U-shaped cross section with enclosing lateral end walls 78 and a center web 80. The lower edges of the end walls 78 and the center web 80 are provided with drain openings 81 to assist in cleaning and the removal of any material which may accumulate therein. Otherwise, the channel member 77, because of its rigid construction, provides a rigid support for the lower portion of the feed hopper 16 to which it is securely attached. The rear edge of the cover plate is defined by a vertical rear face 82 which is provided with a suitable groove to receive an O-ring seal 83. When the cover plate is in its operative position, as shown in the drawings, the O-ring seal prevents the escape of liquid and solid material as a result of high molding pressures imposed on the underlying mold components. When the cover plate is lifted to access the molding station, the seal simply rides along therewith. The upper edge of the front face of the channel member 77 is provided with a chamfer 84 to facilitate downward movement of the cover plate and O-ring seal 83 when the cover plate is returned to its operative position.

I claim:

1. An apparatus for operating a food product molding machine having a feed ram device receiving a food product from a supply and transferring said food product into a mold cavity of a mold plate in a fill position, wherein said mold plate is cycled in a linear reciprocal path defined by a return stroke to a fill position and an opposite discharge stroke to a discharge position, a product discharge device operable while the mold plate is held for a discharge dwell time in the discharge position to remove the product from the mold cavity, and a plate shuttle supporting the mold plate for movement therewith along the linear mold path, the apparatus comprising:

(1) means for driving the plate shuttle to cycle the mold plate in said linear reciprocal path;

(2) means responsive to a fill-on control signal for commencing forward movement of the feed ram device and the feed of a moldable food product to the mold plate cavity;

(3) means responsive to a fill-off control signal for terminating forward movement of said feed ram device and the feed of the food product to the mold cavity; and, (4) means responsive to a discharge position signal for holding the mold plate for a selectively variable discharge dwell time.

2. The apparatus as set forth in claim 1 wherein said fill-on signal is generated during the return stroke.

3. The apparatus as set forth in claim 1 wherein said fill-off signal is generated during the discharge stroke.

4. The apparatus as set forth in claim 1 including means responsive to a fill position signal for holding the mold plate in the fill position for a selectively variable fill dwell time.

5. The apparatus as set forth in claim 1 wherein said feed ram device comprises a pair of alternately operable feed rams, and including:

means responsive to an end of a ram feed stroke signal for reversing one of said rams and for commencing the feed stroke of the other of said rams; and, delay means for holding a response of the other of said rams to said end of ram feed stroke signal until generation of a next fill-off signal.

6. The apparatus as set forth in claim 4 including means for adjusting the discharge dwell time in response to a change in fill dwell time to maintain a constant mold plate cycle time.

* * * * *

(12) EX PARTE REEXAMINATION CERTIFICATE (9411th)
United States Patent
Soper

(10) Number: US 5,980,228 C1
(45) Certificate Issued: *Nov. 16, 2012

(54) FOOD PATTY MOLDING MACHINE

(75) Inventor: James L. Soper, Manitowoc, WI (US)

(73) Assignee: Patriot Universal Holdings, LLC., Hilbert, WI (US)

Reexamination Request:
No. 90/011,591, Mar. 24, 2011

Reexamination Certificate for:
Patent No.: 5,980,228
Issued: Nov. 9, 1999
Appl. No.: 09/047,070
Filed: Mar. 24, 1998

( * ) Notice: This patent is subject to a terminal disclaimer.

Related U.S. Application Data

(63) Continuation of application No. 08/799,116, filed on Feb. 11, 1997, now Pat. No. 5,730,650, which is a continuation-in-part of application No. 08/706,405, filed on Aug. 29, 1996, now Pat. No. 5,655,436.

(51) Int. Cl.
*A22C 7/00* (2006.01)
(52) U.S. Cl. ........ 425/145; 425/150; 425/261; 425/444; 425/449; 426/512
(58) Field of Classification Search ........................ None
See application file for complete search history.

(56) References Cited

To view the complete listing of prior art documents cited during the proceeding for Reexamination Control Number 90/011,591, please refer to the USPTO's public Patent Application Information Retrieval (PAIR) system under the Display References tab.

*Primary Examiner* — Elizabeth McKane

(57) ABSTRACT

A food patty molding machine of the type utilizing a linearly reciprocable mold plate utilizes a direct rotary actuator drive which provides virtually direct linear transfer of the drive force to the ends of the linear drive shafts which support the mold plate. This results in the virtual elimination of high wear lateral loads. An encoder is directly linked to the rotary actuator drive shaft to provide accurate mold plate position signals which are utilized to control the operation of completely independently driven knock-out devices and to control operation of the feed ram during the feed stroke. Servo valve control of the hydraulic power unit which drives the rotary actuator and the feed ram cylinders also responds to suitably processed encoder signals to provide a wide range of speed and position control.

At the time of issuance and publication of this certificate, the patent remains subject to pending reexamination control number 90/020,013 filed Aug. 24, 2012. The claim content of the patent may be subsequently revised if a reexamination certificate issues from the reexamination proceeding.

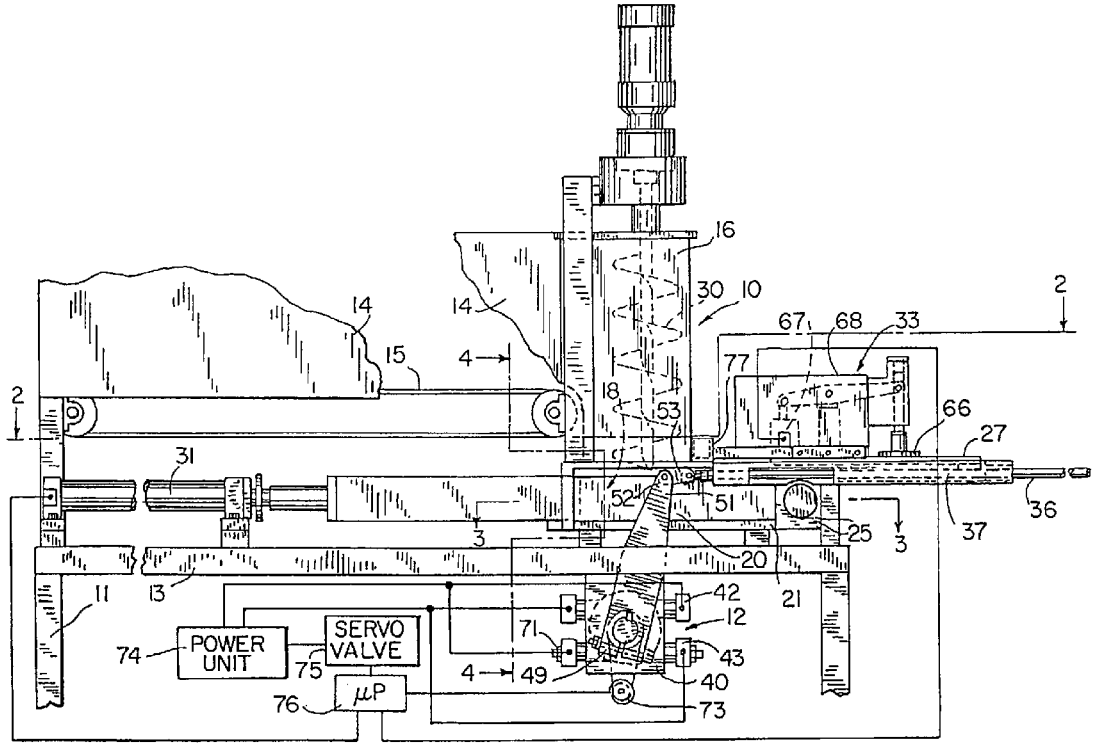

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-6 is confirmed.

New claims 7-23 are added and determined to be patentable.

*7. The apparatus as set forth in claim 1, wherein said means for driving the plate shuttle comprises a rotary actuator.*

*8. The apparatus as set forth in claim 7, wherein said rotary actuator has a main driving shaft which is driven with reciprocating rotary movement.*

*9. The apparatus as set forth in claim 8, wherein a stroke of said reciprocating rotary movement is no greater than about 30 degrees.*

*10. The apparatus as set forth in claim 8, wherein the main driving shaft is driven with said reciprocating rotary movement by at least one linearly movable actuator element.*

*11. The apparatus as set forth in claim 10, wherein said linearly movable actuator element comprises a piston and cylinder.*

*12. The apparatus as set forth in claim 10, wherein said at least one linearly movable actuator element comprises a pair of linearly movable actuator units.*

*13. The apparatus as set forth in claim 8, further comprising an encoder operably connected to said main driving shaft for monitoring mold plate position over a full cycle of mold plate movement.*

*14. The apparatus as set forth in claim 7, further comprising an encoder mounted to be driven by said rotary actuator for monitoring mold plate position over a full cycle of mold plate movement.*

*15. The apparatus as set forth in claim 14, wherein a servo-control drives and stops said rotary actuator based on at least one of control signals representative of mold plate position generated by said encoder.*

*16. The apparatus as set forth in claim 7, wherein said rotary actuator drives a drive arm operably connected to said plate shuttle through a stroke of rotation, said rotary actuator being positioned between extremes of said stroke of rotation.*

*17. The apparatus as set forth in claim 16, wherein said rotary actuator is positioned midway between said extremes of said stroke of rotation.*

*18. The apparatus as set forth in claim 16, wherein said stroke of rotation of said drive arm is no greater than approximately 30 degrees.*

*19. The apparatus as set forth in claim 16, wherein said drive arm is operably connected to a linear drive shaft of said plate shuttle through a drive link pivotably connected to said drive arm and said linear drive shaft, and wherein said drive link is driven through a total arc that is no greater than about 15 degrees.*

*20. The apparatus as set forth in claim 7, further comprising a servo-control that drives and stops said rotary actuator based on control signals representative of mold plate position.*

*21. The apparatus as set forth in claim 1, wherein said means for driving the plate shuttle comprises a servo-control.*

*22. The apparatus as set forth in claim 21, wherein said servo-control imparts reciprocating rotary movement to a drive shaft of the means for driving the plate shuttle.*

*23. The apparatus as set forth in claim 21, wherein said servo-control carries out control based on control signals representative of mold plate position, those signals being generated by an encoder included in said apparatus.*

\* \* \* \* \*

(12) EX PARTE REEXAMINATION CERTIFICATE (9801st)

United States Patent
Soper

(10) Number: US 5,980,228 C2
(45) Certificate Issued: *Aug. 15, 2013

(54) FOOD PATTY MOLDING MACHINE

(75) Inventor: James L. Soper, Manitowoc, WI (US)

(73) Assignee: Patriot Universal Holdings, LLC., Hilbert, WI (US)

Reexamination Request:
No. 90/020,013, Aug. 24, 2012

Reexamination Certificate for:
Patent No.: 5,980,228
Issued: Nov. 9, 1999
Appl. No.: 09/047,070
Filed: Mar. 24, 1998

Reexamination Certificate C1 5,980,228 issued Nov. 16, 2012

(*) Notice: This patent is subject to a terminal disclaimer.

Related U.S. Application Data

(63) Continuation of application No. 08/799,116, filed on Feb. 11, 1997, now Pat. No. 5,730,650, which is a continuation-in-part of application No. 08/706,405, filed on Aug. 29, 1996, now Pat. No. 5,655,436.

(51) Int. Cl.
*A22C 7/00* (2006.01)

(52) U.S. Cl.
USPC ........... 425/145; 425/150; 425/261; 425/444; 425/449; 426/512

(58) Field of Classification Search
None
See application file for complete search history.

(56) References Cited

To view the complete listing of prior art documents cited during the proceeding for Reexamination Control Number 90/020,013, please refer to the USPTO's public Patent Application Information Retrieval (PAIR) system under the Display References tab.

*Primary Examiner* — Jessee Roe

(57) ABSTRACT

A food patty molding machine of the type utilizing a linearly reciprocable mold plate utilizes a direct rotary actuator drive which provides virtually direct linear transfer of the drive force to the ends of the linear drive shafts which support the mold plate. This results in the virtual elimination of high wear lateral loads. An encoder is directly linked to the rotary actuator drive shaft to provide accurate mold plate position signals which are utilized to control the operation of completely independently driven knock-out devices and to control operation of the feed ram during the feed stroke. Servo valve control of the hydraulic power unit which drives the rotary actuator and the feed ram cylinders also responds to suitably processed encoder signals to provide a wide range of speed and position control.

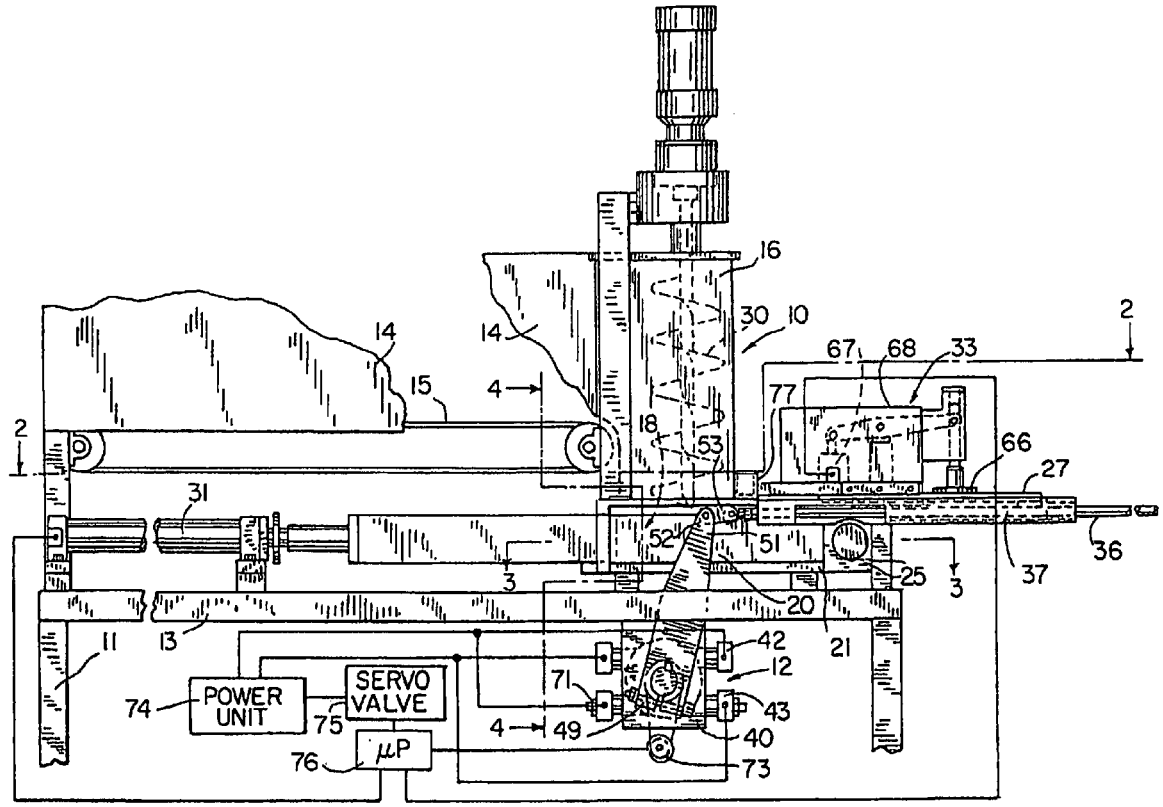

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-23 is confirmed.

* * * * *